United States Patent
Bolind et al.

(10) Patent No.: US 7,765,813 B2
(45) Date of Patent: Aug. 3, 2010

(54) APPARATUS AND PROCESS FOR COOLING AND DE-STEAMING CALCINED STUCCO

(75) Inventors: Michael L. Bolind, Ingleside, IL (US); Christopher R. Nelson, Third Lake, IL (US); Bruce L. Petersen, Lisle, IL (US); Michael J. Porter, Hanover Park, IL (US)

(73) Assignee: United States Gypsum Company, Chicago, IL (US)

( * ) Notice: Subject to any disclaimer, the term of this patent is extended or adjusted under 35 U.S.C. 154(b) by 841 days.

(21) Appl. No.: 10/891,964

(22) Filed: Jul. 15, 2004

(65) Prior Publication Data

US 2006/0010895 A1   Jan. 19, 2006

(51) Int. Cl.
*F28C 1/00* (2006.01)

(52) U.S. Cl. ........... 62/121; 62/304; 239/237; 239/380; 210/272; 210/279; 34/77; 34/90; 165/104.16; 165/104.18

(58) Field of Classification Search ........ 34/77, 34/90; 239/237, 380; 210/272, 279; 62/121, 62/304; 165/104.16, 104.18
See application file for complete search history.

(56) References Cited

U.S. PATENT DOCUMENTS

| | | | |
|---|---|---|---|
| 1,989,615 A | | 1/1935 | Hann |
| 2,586,818 A | * | 2/1952 | Harms ............ 209/474 |
| 4,265,979 A | * | 5/1981 | Baehr et al. ......... 428/171 |
| 4,758,261 A | * | 7/1988 | Parker et al. ............ 71/34 |
| 5,531,634 A | * | 7/1996 | Schott ................. 451/39 |
| 5,570,517 A | | 11/1996 | Luker |

(Continued)

FOREIGN PATENT DOCUMENTS

RU        98117509        8/1997

(Continued)

OTHER PUBLICATIONS

Bel Tech—Pneumatic Conveying Systems: BulkLift Bel-Tech's Line of "No Moving Parts Technology" Conveying Systems.

(Continued)

*Primary Examiner*—Frantz Jules
*Assistant Examiner*—Azim Rahim
(74) *Attorney, Agent, or Firm*—Novak, Druce + Quigg LLP (57) ABSTRACT

The present invention is an apparatus and process for cooling and de-steaming hot calcined stucco used in the production of gypsum boards or bagged plaster. The apparatus is a fluid bed stucco cooler and comprises a cooler housing having a plenum having a stucco inlet and stucco outlet. The stucco cooler includes a rotating disk in the plenum. The rotating disk includes nozzle for spraying fluid, and is attached to a rotable shaft extending from the side of the cooler also includes a fluidization pad and agitator to help to mix the air and the stucco powder to insure fluidization, prevent channeling, and prevent the stucco powder from building up on the various components. The air also forces steam from the hot calcined stucco out through an air outlet located at the top of the stucco cooler, thereby de-steaming the stucco. The stucco flows through the plenum and passes over the cooling coils, thereby cooling the stucco as it reaches the stucco outlet.

23 Claims, 6 Drawing Sheets

U.S. PATENT DOCUMENTS

| | | | | |
|---|---|---|---|---|
| 5,620,250 | A | * | 4/1997 | Chilcoat et al. .......... 366/168.2 |
| 5,984,203 | A | * | 11/1999 | Rosenberg ............. 239/222.11 |
| 6,054,101 | A | | 4/2000 | Langfeldt et al. |
| 6,059,444 | A | * | 5/2000 | Johnson et al. .......... 366/172.2 |
| 6,138,377 | A | * | 10/2000 | Bolind et al. ................. 34/304 |
| 2003/0072872 | A1 | * | 4/2003 | Adair et al. ................. 427/180 |

FOREIGN PATENT DOCUMENTS

| | | |
|---|---|---|
| RU | 2 214 274 C2 | 10/2003 |
| SU | 687022 | 9/1979 |
| SU | 737382 | 5/1980 |
| UA | 20040503452 A | 11/2005 |
| WO | 9730004 A1 | 8/1997 |
| WO | 2004056465 A | 7/2004 |

OTHER PUBLICATIONS

Bel Tech—Beltech Bulklift-Dilute and Two Phase Conveying "No Moving Parts" Pneumatic Elevator.

* cited by examiner

APPARATUS AND PROCESS FOR COOLING AND DE-STEAMING CALCINED STUCCO

BACKGROUND OF THE INVENTION

The present invention relates to an improved apparatus and process for cooling and de-steaming calcined gypsum stucco (calcium sulfate hemihydrate). The cooling of gypsum stucco has been of interest in the gypsum industry for many decades. Stucco is physically and thermodynamically unstable at high temperatures. In order to maintain its quality, the stucco should be quickly aerated and cooled below the temperature of calcination (250° F.). This is especially true when the calcined stucco is to be stored over time. An example of a stucco cooler is U.S. Pat. No. 6,138,377 assigned to U.S. Gypsum Company, and that disclosure is incorporated here by reference.

Hot and steamy calcined stucco stored in containers will age over time. This aging process adversely affects many of the desirable properties of the stucco, including pouring consistency, hydration rate, set time, response to accelerator, and potential for strength development. If a storage silo does not empty its contents on a "first-in-first-out" basis, the quality of the stucco removed from storage can vary drastically. Thus, the cooling and de-steaming of calcined stucco before storage is essential to long-term age stability.

Apart from age stability during storage, a further problem is caused by mechanical energy from tube mill grinding during the processing of the stucco. The mechanical energy adds more heat to the stucco, preventing many plants from being able to meet temperature requirements for bagging the stucco. Thus, immediate cooling and de-steaming of hot calcined stucco allows for stucco to be properly bagged.

Previous coolers, such as the coil cooler described in U.S. Pat. No. 6,138,377 have a high initial capital cost. Specifically, the coils and heat transfer fluid system used in a coil cooler are expensive. Also, a much larger coil cooler is required to cool the same stucco throughput compared to the invention described herein. Further, when the stucco cooled with the apparatus described herein is used to make products such as wall board, the amount of water and additives required is reduced when compared to stucco cooled in other ways. Thus, the invention described herein enjoys an economic and performance advantage over the prior art coolers.

SUMMARY OF THE INVENTION

The present invention is an apparatus and process for cooling and de-steaming hot calcined stucco, such as that used in the production of gypsum boards or plaster products. The apparatus is a fluid bed stucco cooler, the cooler including a water spray apparatus to spray water on the stucco. Typically, hot and steamy calcined stucco is transferred to the cooler from a calcination kettle, and the stucco is then cooled and de-steamed. The cooler can be implemented in a stucco processing line where the stucco may be stored for a period of time after the cooling process, or it can also be directly implemented into a gypsum board production line where the stucco is made available for immediate use. Each cooler unit may stand alone or several may be connected in series or parallel, depending on the processing output and cooling requirements of the system.

The cooler in its basic description comprises a cooler housing having a plenum and a stucco inlet and a stucco outlet. The cooler further includes a water spray apparatus or distributor to spray and distribute fluid, preferably water, in the plenum. The cooler also includes a fluidization pad and an agitator, to move and distribute the stucco within the plenum. Further, refinements, such as the use of compressed air to prevent clogging of the water spray apparatus, are also disclosed.

Hot and steamy stucco powder enters the plenum from a calcination kettle at a temperature of in the range of 290° to 320° F. and is transported to a cooler and is fluidized by a fluidization pad positioned at the bottom of the plenum of the cooler housing. Depending upon the distance and mode of transport from the calcination kettle to the cooler, the stucco entering the cooler may be at a temperature lower than the temperature exiting the calcination kettle. The stucco may be at a temperature as low as 260 to 250° F.

The fluidization pad is a generally cylindrical chamber having a perforated top surface and a bottom surface with an air inlet. As described in U.S. Pat. No. 6,138,377, the fluidization pad can be any shape, including square or rectangular. The fluidization pad is of relatively short height as compared to the plenum height and is positioned such that the perforated top surface comprises the bottom surface of the plenum. Air supplied by a blower enters the air inlet and is diffused through the perforated top surface and introduced into the plenum of the cooler housing. In order to increase the effectiveness of the stucco fluidization, an agitator unit is used to mix the stucco powder with the air to prevent channeling of the air directly through the powder, especially with natural stucco. The agitator unit has an agitator propeller mounted on a shaft that passes thought the top of the housing and extends downward to the propeller, which is preferably positioned just above the perforated top of the fluidization pad. In an alternate embodiment, the agitator extends from the bottom of the housing, and the shaft passes through a tube in the fluidization pad such that the propeller is positioned just above the perforated top surface of the fluidization pad. Each agitator unit also has a seal unit to prevent stucco from exiting the plenum at the location of the shaft. The agitator unit is driven by a motor at an appropriate RPM to insure adequate fluidization. One skilled in the art will recognize that one or more agitators may be used and they may extend from the fluid bed, as described in U.S. Pat. No. 6,138,377.

During the cooling process, the steam from the stucco and steam mixture is forced upward and out of the plenum through the stucco outlet. In an alternate embodiment, the cooler includes an air outlet. Such an outlet is described in U.S. Pat. No. 6,138,377. In the alternate embodiment, the air outlet is located at the top of the cooler housing and is in direct fluid communication with the plenum, thus allowing the removal of steam from the plenum. A disengagement zone is provided at the top of the plenum of the housing below the air outlet. The disengagement zone is an upwardly extending portion of the plenum that provides additional plenum space to allow the stucco powder particles to fall back from the exiting air, thus reducing entrainment of the particles in the air that exits through the air outlet.

In either embodiment, a water spray apparatus is present in the plenum to spray water or other fluid, which cools the stucco. A fixed orifice or a plurality of fixed orifices can be used. In such an embodiment, a nozzle is fixed in an aperture in the plenum wall, and a source of water is connected to the aperture from the exterior of the plenum. However, experimentation revealed that the stucco collected on and around the fixed point of water distribution, causing a buildup of stucco around the fixed point or points of distribution, hampering the operation, and requiring frequent shut down and disassembly for cleaning. In the preferred embodiment, a disk or other rotating member or distributor having a plurality of orifices or nozzles is mounted on a rotatable shaft. The shaft includes a channel or conduit to provide water to the nozzles of the disk. A motor is connected to the shaft to rotate the shaft and hence the disk. The rotation causes any stucco that may try to adhere to the nozzles or area around the nozzles to be cast off, thus alleviating the collection of stucco on the nozzles and eliminating or reducing the build up of stucco around the nozzles and clogging of the cooler with set gypsum.

By operation of the fluidization pad, and water spray, the stucco is thereby cooled and de-steamed when it reaches the stucco outlet at the top of the plenum chamber. The cooled and de-steamed stucco is typically at a temperature between 250° F. and 220° F. when it exits the cooler housing, well below the calcination temperature of 250° F. The cooled and de-steamed stucco may then be stored without the risk of substantial adverse effects due to aging, or use in manufacturing processes. If cooled below 212° F., the evaporation temperature, the stucco is preferably dried and further cooled by feeding the stucco to a second fluidization bed. This second bed acts as a drier to evaporate remaining water, as well as cooling the stucco.

DETAILED DESCRIPTION OF THE INVENTION

With reference to FIGS. 1-4, a fluid bed stucco cooler apparatus 20 for cooling and de-steaming hot calcined stucco is shown. The stucco cooler apparatus 20 essentially comprises a housing 21 having a plenum 22 therein. The housing 21 is generally cylindrical, although other shapes may be used. In an example for processing 40 tons of stucco per hour, the plenum 23 is 24 inches in diameter and approximately 7.5 feet tall. The housing may have other dimensions, depending upon the application and desired throughput. As an example, a plenum designed for an 80 ton per hour throughput has a diameter of 36 inches.

The cooler housing 21 has a stucco inlet 19 and a stucco outlet 29, both located near the top of the cooler housing 21. A baffle 23 is placed in the plenum 22 sidewall near the stucco outlet 29 to control flow out of the outlet 29. Both the stucco inlet 19 and stucco outlet 29 are in fluid communication with the plenum 22. Both the stucco inlet 19 and the stucco outlet 29 are sized to accommodate a flow of stucco desired as the throughput. Hot and steamy stucco powder enters the plenum 22 of the stucco cooler 20 from a calcination kettle (not shown) at a temperature typically in the range of 260° F. to 320° F.

During the cooling and desteaming process, stucco flows into the plenum 22 thru inlet 19 and is cooled by the air flow from the fluidization pad 30 and water from the spray distributor 66, and then expelled out the outlet 29. The cooled stucco can then be bagged, or sent to other processing stations, such as wall board manufacturing lines.

The stucco cooler apparatus 20 can stand alone or be connected in series or parallel with several other coolers, depending upon the cooling requirements of the system. In a preferred embodiment, the stucco cooler apparatus 20 is compact and upright, thereby minimizing the plant floor area occupied. As shown in FIGS. 1 through 4, legs 25 are provided on the cooler housing 21 in order to support the stucco cooler apparatus 20 in an upright position. One skilled in the art will recognize other structures can be used to support the housing.

Figure 1:
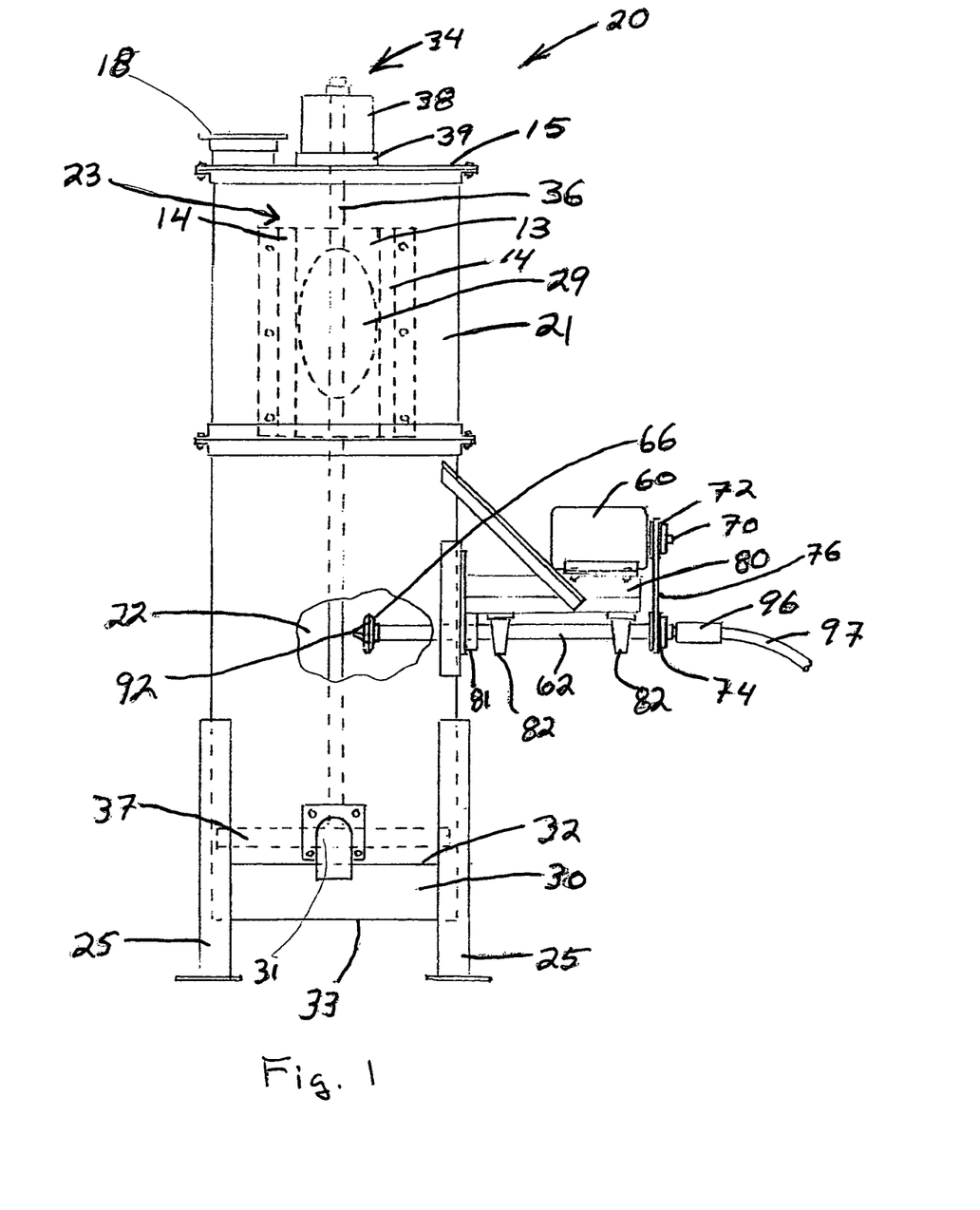
FIG. 1 is a front elevational view of the fluid bed stucco cooling apparatus described herein, including cut-away showing the water spray disk.
Figure 2:
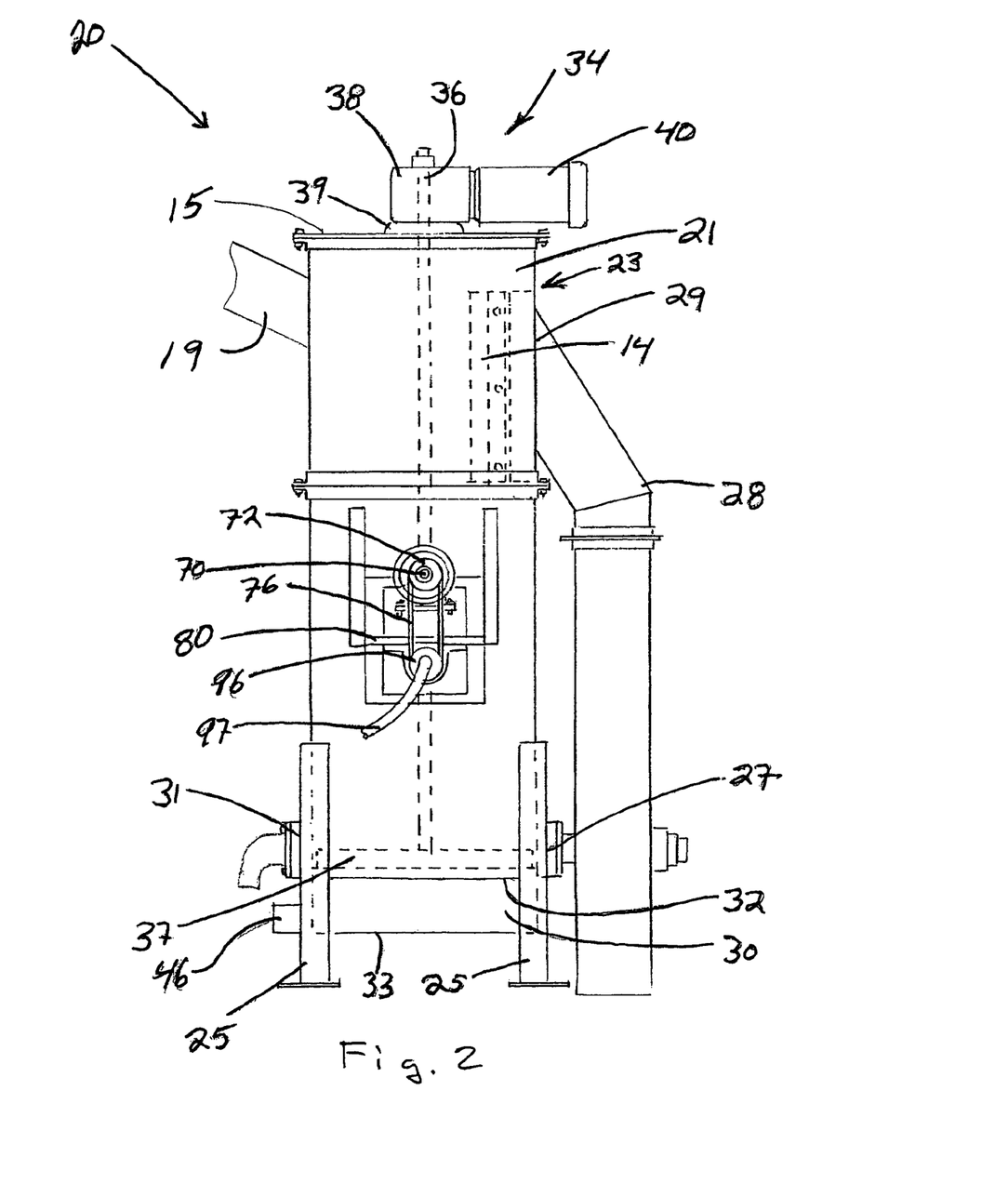
FIG. 2 is a side elevational view of the fluid bed stucco cooling apparatus of FIG. 1.

In order to fluidize the stucco powder within the plenum 22, a fluidization pad 30 is provided at the bottom of the cooler housing 21. The fluidization pad 30 is a generally cylindrical chamber having a perforated top surface 32 and a bottom surface 33 with an air inlet 46. In the preferred embodiment, the perforated top surface 32 is a sandwich of silica fibers or other fluidization media compressed between two perforated plates. The plates have 3/8" diameter holes spaced on 9/16" staggered centers, resulting in an open area of approximately 40%. Other fluidization media known to one skilled in the art could be used, such as a stainless steel mesh. Although cylindrical in the preferred embodiment the fluidization pad 30, and the plenum 22, may be in any shape. The fluidization pad 30 is attached to the bottom of the cooler housing 21. The perforated top surface 32 forms the bottom of the plenum 22. The fluidization media diffuses the air as it enters the plenum 22. Air provided by a blower (not shown) enters the fluidization pad 30 through the air inlet 46 and is diffused through the perforated top surface 32 and introduced into the plenum 22 of the cooler housing 21. This air helps to fluidize the stucco powder so that it effectively flows through the plenum 22. This air flow is also used to help remove the steam from the stucco powder.

In order to prevent the fluidization air from channeling directly through the stucco powder and to minimize stucco powder buildup on surfaces within the plenum 22, an optional agitator 34 is used to mix the stucco powder with the air. If the stucco is fluidizable without agitation, the agitator 34 may be omitted as the cooler 20 will function without the agitator unit 34.

The agitator 34 has an agitator propeller 37 mounted on a shaft 36 that passes through the top 15 of the housing 21, such that the propeller 37 is positioned just above the perforated top surface 32 of the fluidization pad 30. The propeller need not be of any particular shape. In the preferred embodiment, the propeller 37 is a pair of 1/4" wide by 2 inch tall stainless steel bars extending from the shaft to near the walls of the plenum 22. One will recognize other mechanisms could be used to agitate the stucco, such as a swinging gate agitator. If a rectangular or other non-circular housing 21 is used, the propeller 37 is of a size that allows it to rotate without contacting the walls of a plenum 22.

Figure 10:
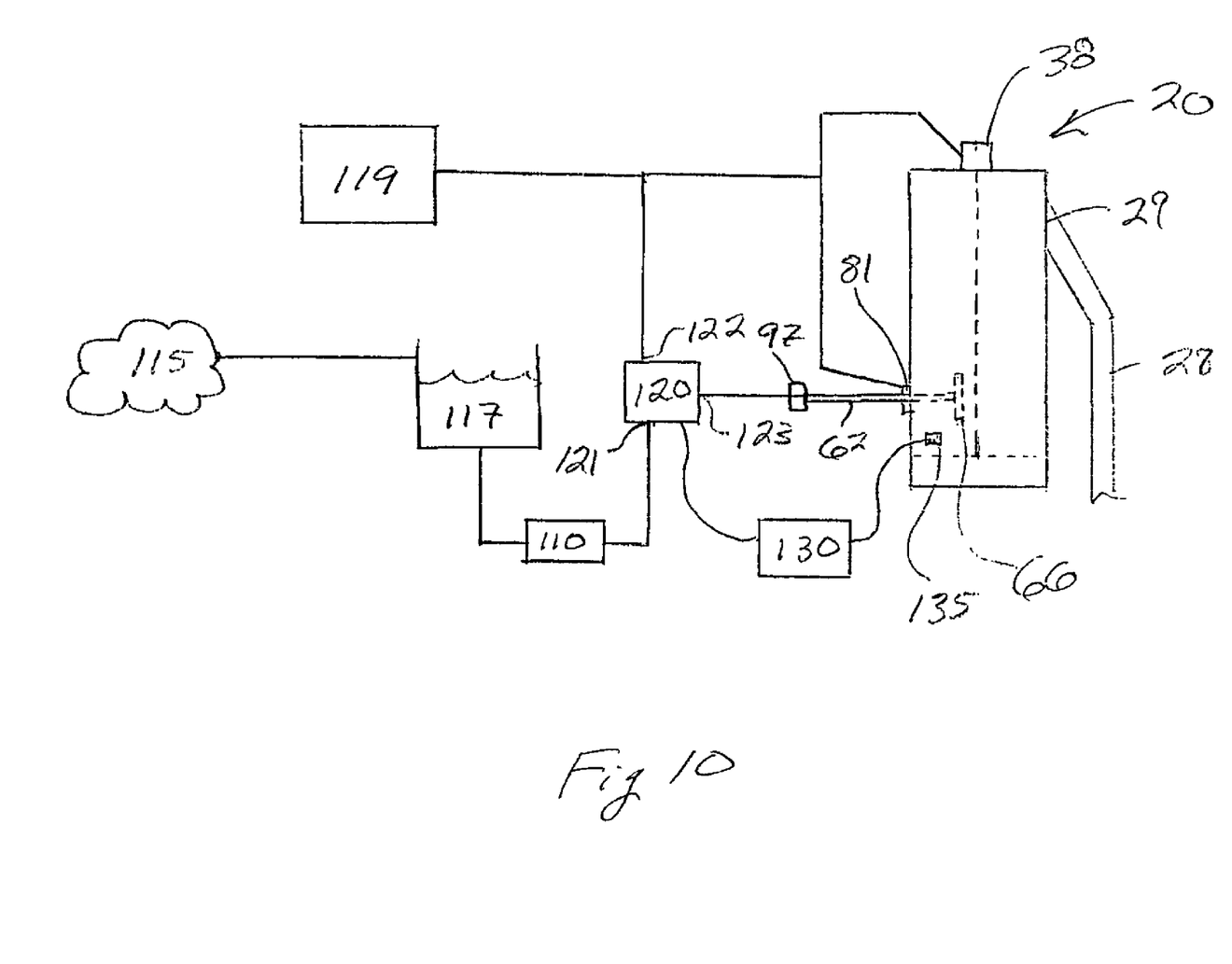
FIG. 10 is a schematic outline of the air and water feeds to the stucco cooler.

The agitator 34 also has a transmission unit 38. The transmission unit 38 converts the horizontal rotation of the motor 40 into vertical rotation for the shaft 36. The transmission unit 38 also includes a bearing to hold the shaft 36 in a rotably fixed position. In the preferred embodiment, the transmission unit 38 is a gear motor supplied by Falk having a part number 05UWFQZA71AB. One skilled in the art will recognize other mechanisms can be used to transmit power to the agitator, such as belts and pulleys, worm gears, planetary gears, and other known assemblies. In order to prevent or reduce the amount of stucco that escapes the plenum 22 through the aperture through which the shaft 36 enters the plenum 22, positive air pressure or other seal is applied to the aperture. Air is provided to the seal 39 by a conduit from outside the transmission unit 38 to the seal 39. The conduit is connected by hoses or piping to a plant source of compressed air 119 as shown in FIG. 10. In the preferred embodiment, the air is regulated to a pressure of 1 psi, or a pressure just sufficient to keep the stucco from exiting the plenum 22 at the aperture. In a preferred embodiment, the motor 40 runs at approximately 60 RPM, although other rotation speeds will work.

Figures 8, 9:
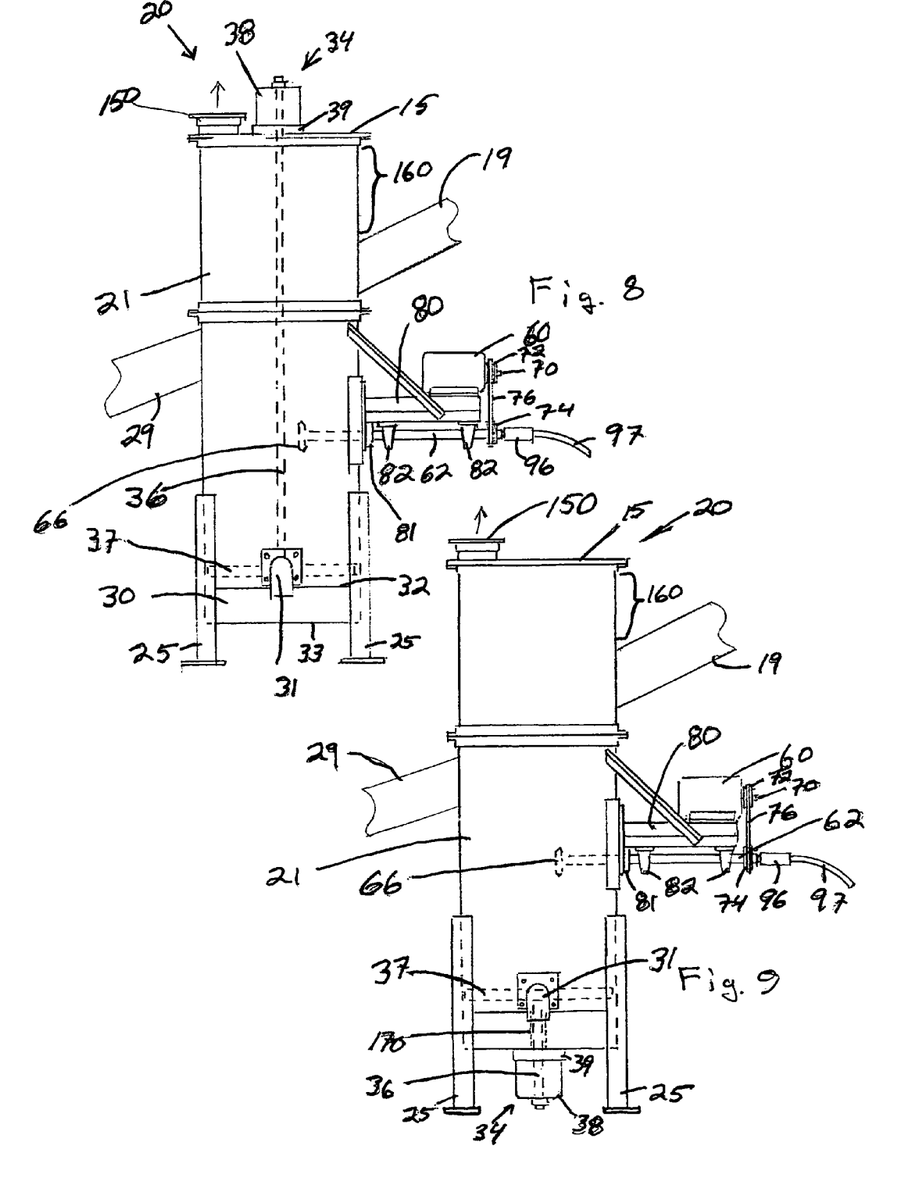
FIG. 8 is a side elevational view of an alternate embodiment of the fluid the bed stucco cooling apparatus having an air outlet.
FIG. 9 is a side elevational view of an alternate embodiment of the fluid bed stucco cooling apparatus, having an agitator mounted through the fluidization bed.

In an alternative embodiment shown in FIG. 9, the agitator unit 34 extends upward into the plenum 22 through the fluidization pad 30. The shaft 36 runs through a tube 170 extending from the bottom of the housing 21 and through the perforated top surface 32. Such an arrangement is described in U.S. Pat. No. 6,138,377. In other respects, the alternative embodiment of the agitator unit, extending through the fluidization pad 30 is similar to the agitator unit previously described.

Figure 3:
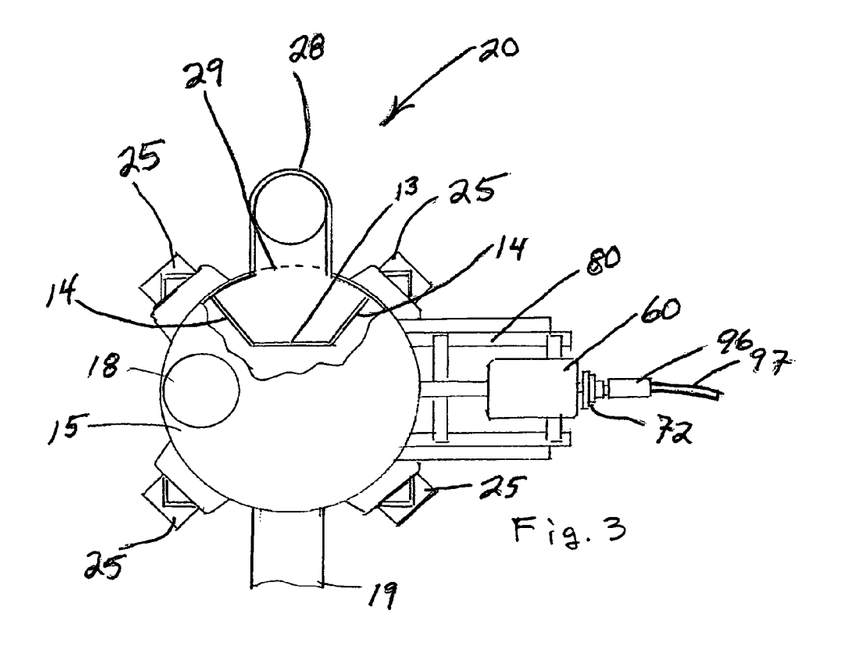
FIG. 3 is a top view of the fluid bed stucco cooling apparatus, showing the baffle.
Figure 4:
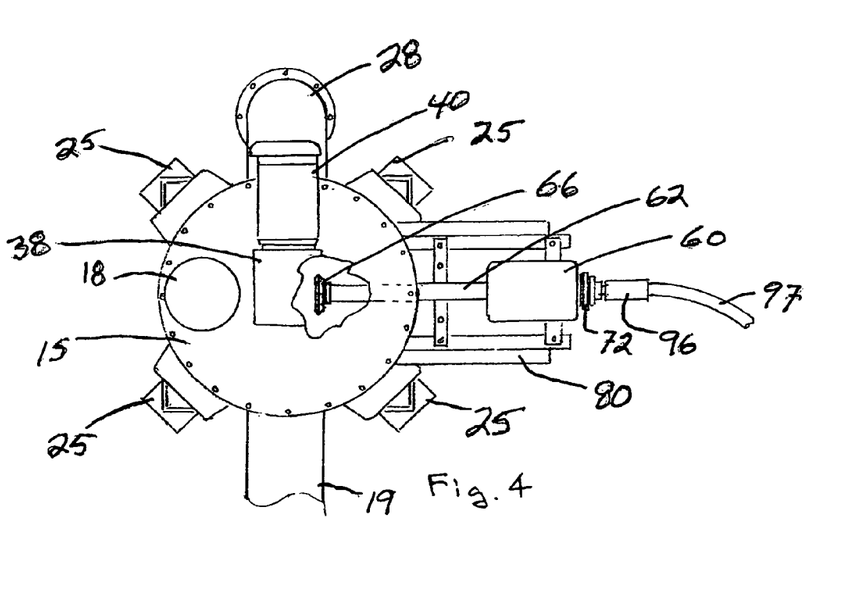
FIG. 4 is a top view of the fluid bed stucco cooling apparatus, including a cut-away showing the water spray disk.

A baffle 23 is provided at the stucco outlet 29 to reduce or prevent the stucco from traveling directly from the stucco inlet 19 to the stucco outlet 29. The baffle 23 is a 10 gauge stainless steel plate attached to the wall of the housing 21. The baffle 23 includes a main portion 13 approximately 8¾" wide, flanked by two side portions 14 approximately 4⅞" inches wide. The side portions 14 are arranged at an angle of approximately 130° to the surface of the main portion 13. When the baffle 23 is attached to the housing 21, it occupies an arc of approximately 80°. The baffle 23 is preferably of sufficient size so as to exceed the dimensions of the stucco outlet 29.

The housing 21 further includes an inspection port 18, The inspection port 18 can be fitted with a removable metal lid to allow for access in to the plenum 22. The inspection port 18 may also be fitted with a clear lid, allowing observation of the plenum 22 during operation of the cooler 20. In alternate embodiments, the inspection port 18 can be left open to the ambient air, or fitted with appropriate duct work, to provide an air outlet 150, as discussed later.

In the preferred embodiment, the stucco outlet 29 leads to an extension tube 28 that extends in a generally downward direction, along the side of the housing 21. Near the bottom of the plenum is a discharge outlet 27, in selective fluid communication with the extension tube. The fluid communication is regulated by a valve, which is normally in the closed position. The valve is opened when the operator desires to empty the plenum 22 of stucco, such as after shutdown of the process line, or in the event of an overfill condition. A second discharge outlet 31 can be located in the housing approximately 180° from the first, to increase the rate of discharge, and to more easily completely clear the plenum 22 of stucco. The second discharge outlet 31 need not be connected to the extension tube 28, although it can be in order to provide a contained path to dispose of the stucco.

The stucco cooler apparatus 20 achieves fluidization by a low pressure blower in connection with the fluidization pad 30 and agitator units 34. In a preferred embodiment, a blower having a capacity of approximately 20 cfm per square foot of horizontal cross-sectional area of the plenum 22 and providing a pressure head of approximately 6 psi is utilized. This creates the required pressure differential to allow fluidization of the stucco powder in the stucco cooler 20.

With reference to FIGS. 1-6, the water spray or distributor apparatus of the preferred embodiment includes a motor 60, a shaft 62 having a channel 64 for communication of fluid there through, and a spray distributor 66, including a plurality of channels 92 in fluid communication with channel 64 of the shaft 62.

Figure 5:
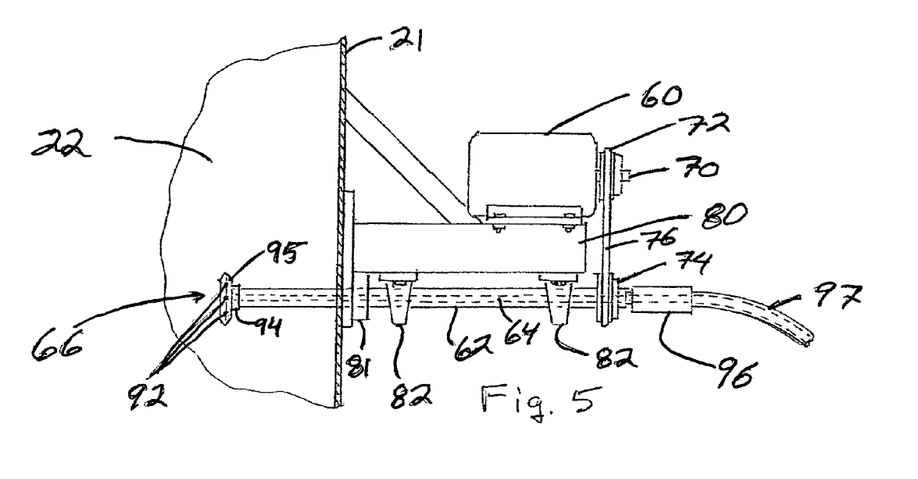
FIG. 5 is a side view of the water spray assembly, including a cut-away showing the shaft and disk inside the plenum.

The motor 60 is preferably an electric motor capable of turning the shaft 62 and spray distributor 66 assembly at a rotation speed of 1750 RPM. The motor includes a drive shaft 70 and a drive pully 72. A pully 74 is mounted on the shaft 62 and connected to the drive pully 72 by a drive belt 76. One skilled in the art will recognize other arrangements can be used to transfer power from the motor to the shaft, such as a gear box or direct drive of the shaft.

In the preferred embodiment, the motor 60 and shaft 62 are mounted on a support assembly 80. The support assembly 80 is fastened or welded to the outside of the housing 21. The shaft 62 is mounted to the support assembly 80 by bearings 82, which allow the shaft 62 to rotate about its axis. The shaft is positioned in a generally horizontal position and extends into the plenum 22 through an aperture in the housing 21. A shaft seal 81 is fitted around the shaft 62 at the point of entry into the aperture. The shaft seal 81 keeps material from within the plenum 23 from exiting at the aperture. In the preferred embodiment, the shaft seal 81 includes an air channel to allow communication of compressed air from the exterior of the seal, to the interior of the seal. An example of such a seal is CinchSeal® brand seals manufactured by Damar Inc. of Cherry Hill, N.J. When CinchSeal® brand seals are used, compressed air from a plant compressed air source 119, typically in the range of 80 to 100 psi, is reduced to 5-15 psi and supplied to the shaft seal 81 by suitable pipes or hose.

Figure 6:
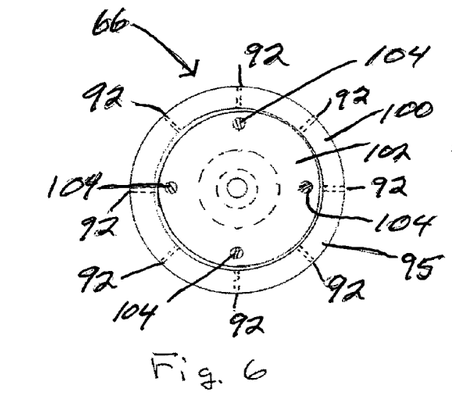
FIG. 6 is a front view of the water spray disk.
Figure 7:
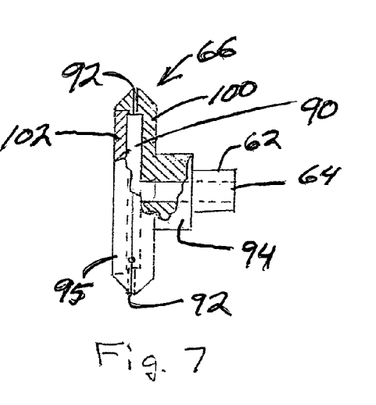
FIG. 7 is an edge-on view of the water spray disk.

The spray distributor 66, shown in detail in FIGS. 6 and 7, is a generally circular shaped disk. It need not be circular, but may be of any convenient shape. In the preferred embodiment, the spray distributor 66 is approximately 4" in diameter and ¾" thick about its disk portion 95. The interior of the spray distributor 66 includes a plenum 90. Extending from the plenum 90 to the perimeter of the spray distributor 66 are spray channels 92 having orifices to the atmosphere. The spray channels 92 allow fluid in the plenum 90 to be expelled from the spray distributor 66. In the preferred embodiment, there are eight spray channels 92. One will recognize the number can be varied to suit a desired water application rate. In the preferred embodiment, the spray channels 92 are approximately ¹⁄₁₆" in diameter. The diameter and any other dimensions of the spray channels 92 may vary with the desired application rate and distribution pattern desired. Nozzles may be fitted to the spray channels 92 to create patterned spray, although they are not necessary to achieve the desired cooling results.

The spray distributor 66 includes a collar portion 94 to provide attachment to the shaft 26. In the preferred embodiment, threads (not shown) in the collar 94 are used to attach the collar portion 94 to corresponding threads (not shown) on the shaft 62. One skilled in the art will recognize that other structures can be used to attach the spray distributor 66 to the shaft 62. Rivets, welds, adhesives, and set screws are some examples. Further, the shaft 62 and spray distributor 66 could be formed as a single piece.

In the preferred embodiment, the spray distributor 66 is formed of two pieces. A main body 100 including the collar portion 94 and disk portion 95, and a cover 102. Such a construction allows access into the plenum 90 when the cover 102 is removed, and also makes manufacture by machining possible. Such construction also permits cleaning of the spray channels 92. The cover is retained by fasteners 104. In the preferred embodiment, the fasteners 104 are screws, however other removable fasteners could be used. If interior access is not desired, the cover 102 could be joined to the main body 100 by welds or adhesive.

In an alternate embodiment, the spray distributor 66 can be an arrangement of conduits extending radially from the shaft 62. The conduits are in fluid communication with the channel 64, allowing fluid to be passed from the channel 64 to the conduits and expelled from the conduits at orifaces. One skilled in the art will recognize the conduit need not extend perpendicular to the axis of the shaft, but could also be placed at angles to the shaft, so long as the rotational forces created when the assembly rotates are sufficient to keep stucco from building up or adhering to the distributor 66.

In another alternate embodiment, the spray distributor 66 can be eliminated by placing radial channels in the shaft 62, allowing for communication of fluid from the channel 64 to the radial channels, and out into the plenum 22. In such an embodiment, the shaft 62 extends across part or all of the diameter of the plenum 22, with radial channels placed at various locations along the shaft's length within the plenum 22.

In any of the embodiments, water is provided to the rotating shaft 62 by a fluid coupling 96. An example of such a coupling is a high speed single flow rotating joint number 9177K32 supplied by McMaster-Carr. The fluid coupling 96 allows a fixed pipe or hose 97 to provide water to the channel 64 of the rotating shaft 62. The water may be provided by any number of sources, such as city tap water, a gravity feed tank or a pump, so long as sufficient water can be delivered. In the preferred embodiment, as outlined in FIG. 10, the water is delivered from the city tap 115 and held in a 30 gallon head tank. Water is drawn from the tank by a water pump 110 capable of pumping 5 gallons per minute.

The cooling taking place in the stucco cooler can be regulated by adjusting the amount of water delivered by the spray distributor 66. In the preferred embodiment, the water pump 110 supplies water to a 3-way valve assembly having an input for water 121 and an input for compressed air 122 from the plant compressed air source 119, and an output 123 for providing any mixture of the two inputs, including all of air or water. The valve output is connected by suitable conduit to the fluid coupling 97 for delivery to the water spray distributor 66 by way of the channel 64 in the shaft 62. In the preferred embodiment, either air or water is delivered from the output 123. In a typical application, air is delivered at approximately 80 to 100 psi to the valve. The valve is controlled by a controller 130 that receives a signal from a thermocouple or other temperature sensor 135 placed in the plenum 22. When the controller 130 senses a temperature of less than 212° F., it adjusts the valve assembly 120 so that only air is delivered to the spray distributor 66. When the temperature is equal to, or above 220° F., the valve assembly 120 is adjusted so water is delivered to the spray distributor 66. One skilled in the art will recognize that a mixture of air and water could also be delivered, the mixture varying to achieve the desired cooling rate and water usage. In operation, it is preferred that air or water is supplied to the distributor any time there is stucco in the plenum 22, to prevent any stucco from entering the distributor 66 possibly causing clogging of the distributor 66.

In an alternate embodiment shown in FIGS. 8 and 9, the steam from the stucco mixture is forced upward and out of the plenum 22 through an air outlet 150. The air outlet 150 is located at or near the top of the cooler housing 21, and above the level of the stucco outlet 29, thus allowing the removal of steam from the plenum 22. The disengagement zone 160 is an upwardly extending portion of the plenum 22 located above the stucco outlet 29. As the air is removed from the plenum 22 through the air outlet 150, the disengagement zone 160 provides space to allow the stucco powder particles to drop and fall back before possibly entering the air outlet 150, thereby preventing entrainment of the stucco powder particles in the air that exits through the air outlet 150. The air outlet 150 is typically in fluid communication with a dust collector (not shown), which collects and filters any stucco particle residue within the air. However, it has been found that the air outlet is not necessary, and sufficient cooling is achieved by allowing the steam to exit the plenum 22 through the stucco outlet 29.

Performance requirements of a cooling system can also be met by using more than one cooling apparatus 20, either in parallel, or in series. A similar arrangement is described in U.S. Pat. No. 6,138,377. Additionally, if further drying or cooling below 212° F., the stucco exiting the stucco outlet 29 can be fed to a drier, such as a fluid bed drier, familiar to one skilled in the art. Any drier that provides a flow of air without adding heat to the stucco may be considered for the drier.

While specific embodiments of the present invention have been shown here for the purposes of explaining preferred and alternate embodiments of the invention, it is to be understood that the appended claims have a wide range of equivalents and a broader scope than the embodiments disclosed.

What is claimed is:

1. An apparatus for cooling and de-steaming hot and steamy calcined stucco powder, including:
    a housing defining a plenum, the housing having vertical sidewalls;
    an inlet for allowing stucco powder into the plenum;
    an outlet for allowing the stucco powder out of the plenum;
    a fluidization pad in a lower portion of the plenum in fluid connection with the plenum and directed to blow air vertically upwardly through said stucco to produce an air fluidized bed comprising the stucco powder and air within the plenum; and
    a water spray device positioned within the plenum for spraying water for cooling the stucco within the plenum, wherein the water spray device includes a rotatable assembly for in the plenum, said assembly for receiving water and spraying water as the rotatable assembly rotates, wherein the plenum has an absence of cooling coils, wherein the rotatable assembly has an orifice, wherein the stucco outlet is at an upper portion of the plenum and the water spray device is at a height between a height of the fluidization pad and a height of the stucco outlet.

2. The apparatus of claim 1, where the water spray device includes a spray nozzle mounted on a wall defining the plenum, wherein the stucco outlet is at a top of the plenum and the water spray device is at a height between a height of the fluidization pad and a height of the stucco outlet.

3. The apparatus of claim 1, where the rotating assembly includes a disk having a perimeter, said disk having channels in communication with orifices on the perimeter of the disk, said orifices spraying the water as the disk rotates.

4. The apparatus of claim 1, where the assembly is rotatable at 1800 revolutions per minute.

5. The apparatus of claim 3, where the assembly is rotatable at a rate sufficient to dislodge stucco near the orifices.

6. The apparatus of claim 1, for cooling calcined stucco further including:
    an agitator within a lower portion of the plenum above the fluidization pad.

7. The apparatus of claim 1, wherein the rotatable assembly is configured for rotating about a horizontal axis perpendicular to the housing vertical sidewalls.

8. The apparatus of claim 7, said water spray device including a hollow shaft having a first end and a second end, the first end receiving water, said second end in communication with a water distributor, said water distributor having channels to distribute water received from the hollow shaft, said water distributor rotating within the plenum.

9. An apparatus for cooling and de-steaming hot and steamy calcined stucco powder including:
   a housing defining a plenum, the housing having vertical sidewalls;
   an inlet for stucco powder to enter the plenum;
   an outlet for stucco powder to exit the plenum;
   a fluidization pad in a lower portion of the plenum in fluid communication with the plenum wherein the fluidization pad is positioned to blow air vertically upwardly through the stucco to produce an air fluidized bed comprising the stucco powder and air; and
   an orifice within the plenum in fluid communication with a source of water, said orifice positioned to spray water on the stucco for cooling the stucco within the plenum, wherein the plenum has an absence of cooling coils, wherein the orifice is part of an assembly rotatable within the plenum, wherein the stucco outlet is at an upper portion of the plenum and the assembly is at a height between a height of the fluidization pad and a height of the stucco outlet.

10. The apparatus of claim 9, further comprising an agitator having at least a portion positioned above the fluidization pad to agitate the stucco within the plenum and mix the stucco powder with air.

11. The apparatus of claim 1, further comprising a source of compressed air; and wherein the orifice is selectively in communication with the source of water and selectively in communication with the source of air, said orifice positioned to spray air or water onto the stucco within the plenum.

12. The apparatus of claim 11, further comprising a temperature sensor to monitor the temperature of the stucco within the plenum, said sensor producing a signal related to the temperature;
   a controller for receiving the signal and adjusting the amount of air or water delivered to the orifice.

13. The apparatus of claim 9, wherein the orifice rotates about a horizontal axis perpendicular to the housing vertical sidewalls.

14. A method of cooling and de-steaming hot and steamy calcined stucco powder, including the steps of:
   introducing stucco powder into a plenum within a housing having vertical sidewalls;
   blowing air vertically upwardly through the stucco from a fluidization pad provided in a lower portion of the plenum to produce an air fluidized bed comprising stucco powder and air;
   spraying a stream of water from a water spray device within the plenum on the stucco to cool the stucco;
   expelling the powder from an outlet of the plenum, wherein the plenum has an absence of cooling coils,
   wherein the water spray device comprises a rotatable assembly within the plenum and the rotatable assembly in the plenum has an orifice,
   wherein the stucco outlet is at a top of the plenum and the water spray device is at a height between a height of the fluidization pad and a height of the stucco outlet.

15. The method of claim 14, wherein the plenum has a stucco inlet and a stucco outlet, wherein the stucco outlet is at a top of the plenum;
   wherein the fluidization pad in fluid communication with the plenum blows the air through the stucco within the plenum to produce a fluidized bed; whereby the calcined stucco is cooled and desteamed.

16. The method of claim 14, wherein said rotatable assembly receives water and sprays water as it rotates, wherein rotational forces created when the assembly rotates are sufficient to keep stucco from building up or adhering to the assembly.

17. The method of claim 14, wherein the stucco powder expels from the plenum with air.

18. The apparatus of claim 1, wherein the fluidization pad is the bottom of the plenum.

19. The method of claim 14, wherein a housing defines the plenum; wherein the water spray device rotates about a horizontal axis perpendicular to the housing vertical sidewalls.

20. The method of claim 14, wherein the stucco powder expelled from the plenum is at a temperature between 250° F. and 220° F.

21. The method of claim 14, wherein the stucco powder expelled from the plenum is at a temperature less than or equal to 250° F.

22. The method of claim 14, wherein the stucco powder expelled from the plenum is at a temperature less than or equal to 212° F.

23. The apparatus of claim 1, including:
   wherein the housing has a top wall and a bottom wall;
   the stucco inlet located in an upper portion of the housing;
   a baffle placed in the plenum near the stucco outlet, the baffle having a first vertical edge attached to an inner wall of the sidewall alongside a first portion of a perimeter of the stucco outlet and a second vertical edge attached to the inner wall of the sidewall alongside a second portion of the perimeter of the stucco outlet, the baffle defining a baffle top opening between the baffle and the sidewall in communication with the plenum and a baffle bottom opening between the baffle and the sidewall in communication with the plenum;
   the baffle top opening opposed to the baffle bottom opening;
   the fluidization pad disposed vertically below the housing top wall; and
   wherein the rotatable assembly is configured for rotating about a horizontal axis perpendicular to the housing vertical sidewalls;
   an agitator within the plenum;
   the agitator comprising an agitator propeller and a vertical shaft for rotating the agitator propeller attached to the agitator propeller, wherein the rotatable assembly rotates about a horizontal axis perpendicular to the housing.

* * * * *